(12) United States Patent
Regan et al.

(10) Patent No.: US 7,792,942 B1
(45) Date of Patent: Sep. 7, 2010

(54) DHCP SERVER SYNCHRONIZATION WITH DHCP PROXY

(75) Inventors: Joseph M. Regan, Pleasanton, CA (US); Ron E. Haberman, San Jose, CA (US)

(73) Assignee: Alcatel Lucent, Paris (FR)

( * ) Notice: Subject to any disclaimer, the term of this patent is extended or adjusted under 35 U.S.C. 154(b) by 397 days.

(21) Appl. No.: 11/712,576

(22) Filed: Feb. 27, 2007

Related U.S. Application Data

(60) Provisional application No. 60/898,793, filed on Jan. 31, 2007.

(51) Int. Cl.
- G06F 15/173 (2006.01)
- G06F 15/177 (2006.01)
- G06F 15/16 (2006.01)
- H04L 12/28 (2006.01)

(52) U.S. Cl. .................. 709/223; 709/220; 709/248; 370/254

(58) Field of Classification Search .................. 709/226
See application file for complete search history.

(56) References Cited

U.S. PATENT DOCUMENTS

| | | | | |
|---|---|---|---|---|
| 5,918,016 | A * | 6/1999 | Brewer et al. | 709/220 |
| 6,697,360 | B1 * | 2/2004 | Gai et al. | 370/389 |
| 7,058,059 | B1 * | 6/2006 | Henry et al. | 370/395.1 |
| 2002/0009078 | A1 * | 1/2002 | Wilson et al. | 370/389 |
| 2002/0073182 | A1 * | 6/2002 | Zakurdaev et al. | 709/220 |
| 2002/0138614 | A1 * | 9/2002 | Hall | 709/225 |
| 2002/0191567 | A1 * | 12/2002 | Famolari et al. | 370/335 |
| 2004/0052216 | A1 * | 3/2004 | Roh | 370/252 |
| 2004/0071164 | A1 * | 4/2004 | Baum | 370/469 |
| 2005/0080927 | A1 * | 4/2005 | Anderson et al. | 709/245 |
| 2005/0114492 | A1 * | 5/2005 | Arberg et al. | 709/223 |
| 2005/0114515 | A1 * | 5/2005 | Droms | 709/227 |
| 2005/0181764 | A1 * | 8/2005 | Hahn et al. | 455/411 |
| 2005/0249134 | A1 * | 11/2005 | Lin | 370/278 |
| 2005/0267954 | A1 * | 12/2005 | Lewis et al. | 709/221 |
| 2006/0067321 | A1 * | 3/2006 | Satou | 370/392 |
| 2006/0239266 | A1 * | 10/2006 | Babbar et al. | 370/392 |
| 2006/0271664 | A1 * | 11/2006 | Ono et al. | 709/223 |
| 2007/0123253 | A1 * | 5/2007 | Simongini et al. | 455/433 |
| 2007/0162594 | A1 * | 7/2007 | Henry et al. | 709/224 |
| 2007/0214270 | A1 * | 9/2007 | Absillis | 709/227 |
| 2007/0214352 | A1 * | 9/2007 | Convery et al. | 713/153 |

OTHER PUBLICATIONS

R. Droms, Dynamic Host Configuration Protocol, RFC 2131, Mar. 1997.*

(Continued)

Primary Examiner—Saleh Najjar
Assistant Examiner—Robert Shaw
(74) Attorney, Agent, or Firm—Van Pelt, Yi & James, LLP

(57) ABSTRACT

Managing a network resource is disclosed. An indication that a resource assigned to a subscriber host by a resource allocating node is no longer to be used by the subscriber host is received at a node other than the subscriber host or the resource allocating node. A resource release communication is sent to the resource allocating node from said node other than the subscriber host or the resource allocating node. The resource release communication appears to the resource allocating node to originate from the subscriber host and indicates to the resource allocating node that the resource is no longer to be used by the subscriber host.

14 Claims, 3 Drawing Sheets

OTHER PUBLICATIONS

S. Alexander & R. Droms, DHCP Options and BOOTP Vendor Extensions, RFC 2132, Mar. 1997.*

T'Joens, et al., DHCP reconfigure extension, RFC 3203, Dec. 2001.*

Ehternet/IP, Recommended Operation for Switches Running Relay Agent and Option 82 (ODVA_DHCP_Option82v2), Sep. 7, 2004.*

* cited by examiner

DHCP SERVER SYNCHRONIZATION WITH DHCP PROXY

CROSS REFERENCE TO OTHER APPLICATIONS

This application claims priority to U.S. Provisional Patent Application No. 60/898,793 entitled DHCP SERVER SYNCHRONIZATION WITH DHCP PROXY, filed Jan. 31, 2007 which is incorporated herein by reference for all purposes.

BACKGROUND OF THE INVENTION

Typically, a DHCP server grants to a requesting host a lease to an IP address for a specified, typically rather long time. If a subscriber host associated with a provider network is terminated by the provider (e.g., change of authorization) prior to expiration of the DHCP lease, typically the DHCP client at the host will not send to the DHCP server a communication to release the IP address, which results in the DHCP server believing the IP address to be unavailable for use by other hosts until the lease expires.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Acting on behalf of a subscriber host to release early an IP address or other resource no longer being used by the subscriber host is disclosed. In some embodiments, it is determined at a node other than a subscriber host or a resource allocating node that a resource assigned to the subscriber host by the resource allocating node, such as an IP address, is no longer to be used by the subscriber host. A resource release communication that appears to the resource allocating node to originate from the subscriber host is sent to the resource allocating node. The resource release communication indicates to the resource allocating node that the resource is no longer to be used by the subscriber host. In some embodiments, the resource then becomes available to be reallocated to another host.

Figure 1:
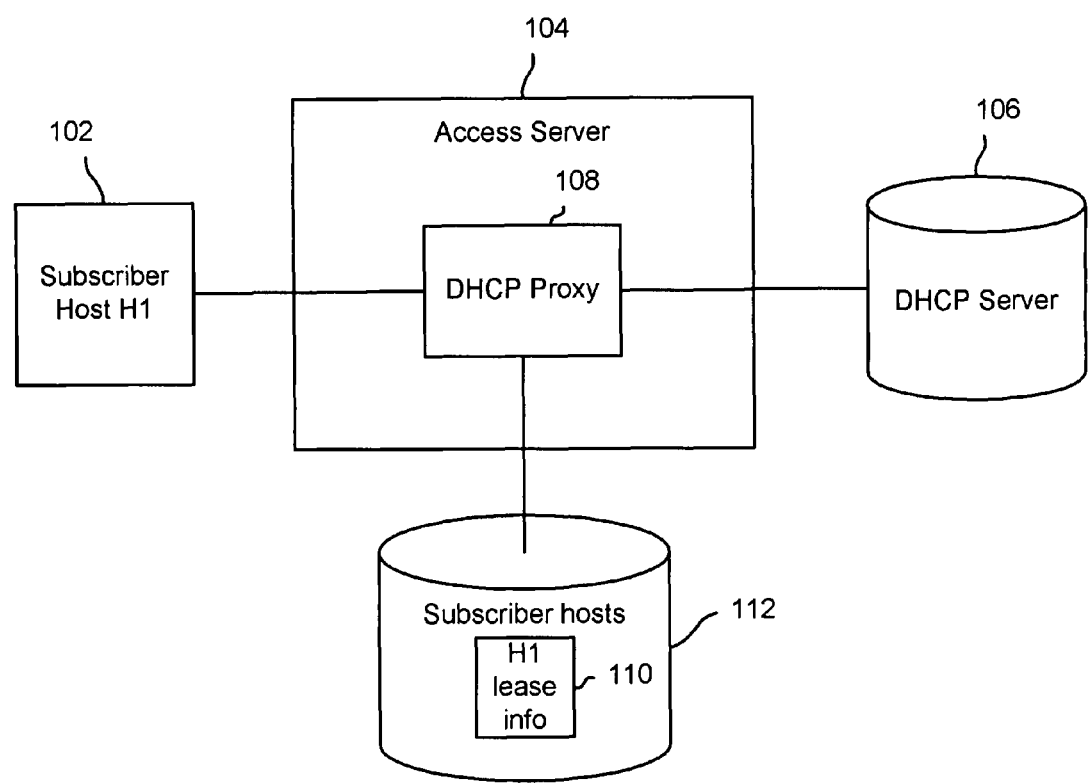
FIG. 1 is a block diagram illustrating an embodiment of a system for causing an allocated resource to be released. In the example shown, a subscriber host 102 communicates via an access server 104, such as a provider edge switch or router or other provider equipment, with a DHCP server 106, e.g., to request an IP address to use to access network services via a provider network with which the access server 104 is associated.

FIG. 1 is a block diagram illustrating an embodiment of a system for causing an allocated resource to be released. In the example shown, a subscriber host 102 communicates via an access server 104, such as a provider edge switch or router or other provider equipment, with a DHCP server 106, e.g., to request an IP address to use to access network services via a provider network with which the access server 104 is associated. A DHCP proxy 108 running at the access server 104 monitors the DHCP lease communications exchanged between a DHCP client (not shown) running at the subscriber host 102 and the DHCP server 106. In some embodiments, the DHCP proxy 108 is configured to extract from a DHCP lease acceptance acknowledgement (ACK) message from the DHCP server 106 to the subscriber host 102 an IP address assigned to and/or other information associated with the subscriber host 102, and to use such extracted information to store in a subscriber host data store 112 an IP lease information record 110 associating the assigned IP address with the subscriber host to which it has been leased and a corresponding lease period and/or time of expiration. In various embodiments, such information is used at the access server to determine the access rights of the subscriber host 102, which services the subscriber host is entitled to access, what level of service is to be provided, etc.

In some embodiments, if a subscriber host such as subscriber host 102 is terminated prior to expiration of an associated IP address lease, for example due to non-payment of a bill, the subscriber changing providers or otherwise canceling his/her account, etc., the DHCP proxy 108 (or some other logic and/or process on access server 104) sends to the DHCP server 106 a communication that appears to the DHCP server to be one from the DHCP client at the affected subscriber host, i.e., subscriber host 102 in the example shown, explicitly releasing the previously-allocated IP address prior to expiration of the lease term. In various embodiments, well known techniques for "spoofing" the source IP address of a communication are used to make the communication appear to the DHCP server 106 to have originated from the DHCP client at the subscriber host. In some embodiments, the DHCP proxy 108 is configured to respond, on behalf of and appearing as the DHCP client, to any further communication from the DHCP server 106, e.g., to acknowledge a message indicating that the communication affirmatively releasing the IP address has been processed by the DHCP server.

Figure 2:
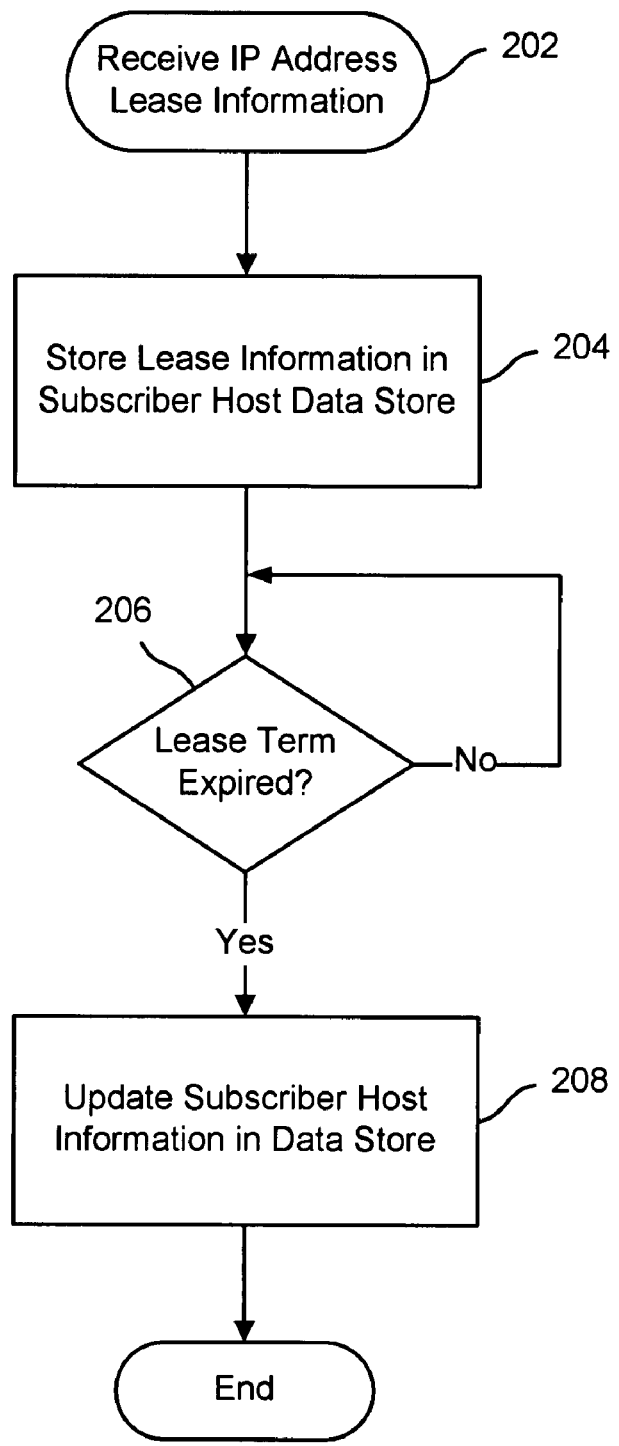
FIG. 2 is a flow chart illustrating an embodiment of a process for determining and storing subscriber host IP address information.

FIG. 2 is a flow chart illustrating an embodiment of a process for determining and storing subscriber host IP address information. IP address information associated with a subscriber host is received (202). In some embodiments, the IP address information is extracted from IP address lease communications by a provider equipment configured to server as a relay and/or proxy for such communications. The IP address lease information is stored in a subscriber host data store (204), e.g., at a provider equipment that extracted the information from IP address lease communications. The IP address information is maintained in the subscriber host information store until the lease term has expired (206), after which the subscriber host information in the data store is updated to reflect that the lease has expired (208) or, more typically, to reflect a new lease term and/or expiration date/time if the lease has been renewed.

Figure 3:
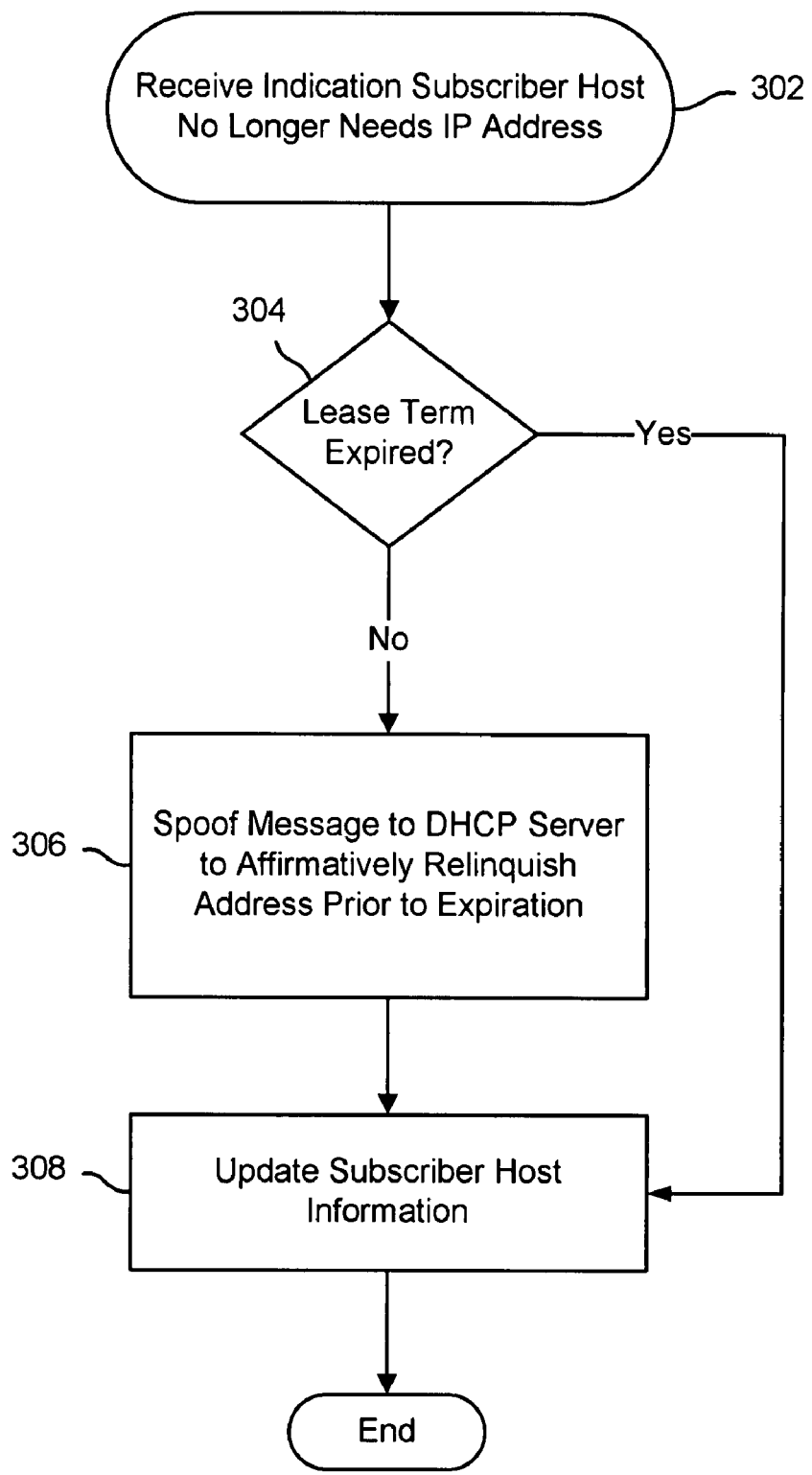
FIG. 3 is a flow chart illustrating an embodiment of a process for causing an IP address to be released prior to expiration of an associated lease term.

FIG. 3 is a flow chart illustrating an embodiment of a process for causing an IP address to be released prior to expiration of an associated lease term. An indication is received that a subscriber host no longer needs and/or no longer will be permitted to use an IP address that has been assigned to the subscriber host (302). If the lease term has not expired (or in some embodiments if the lease term will not expire within a prescribed time) (304), a message is sent to the DHCP server, in a manner that makes the message appear to the DHCP server to come from the subscriber host, to affirmatively relinquish the IP address prior to expiration of the lease term (306). Once the message to the DHCP server has been sent (and acknowledged, if applicable) (306) and/or if the lease term is determined to have expired (304), the subscriber host information is updated to reflect that the IP address is no longer associated with the host (308).

While in a number of examples described above the allocated resource at issue is an IP address, the techniques described herein may be applied to cause other resources assigned to a subscriber host to be released prior to expiration of an associated lease or other term, for example upon termination or other change of authorization with respect to a subscriber host. Using techniques described herein, potentially scarce resources, such as available IP addresses, can be conserved, allowing a greater number of subscribers to be served using a limited pool of resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of managing network resources, comprising:
    receiving at an intermediary node other than a subscriber host or a resource allocating node an indication that a resource assigned to the subscriber host by the resource allocating node will no longer be used by the subscriber host;
    wherein the resource allocating node comprises a DHCP server;
    wherein the subscriber host comprises a DHCP client;
    wherein the intermediary node comprises a provider equipment associated with a provider network; and the subscriber host uses the resource to access a network service via the intermediary node;
    wherein the intermediary node manages indications from the subscriber host regarding resource usage on behalf of the subscriber host such that actual resource usage is synchronized between subscribers and the resource allocating node by tracking resource usage in the intermediary node; and
    if the DHCP lease term associated with the resource is determined by the intermediary node to have not expired or will not expire within a period prescribed by the resource allocating node, sending to the resource allocating node from said intermediary node a resource release communication that is not originated from the subscriber host, but appears to the resource allocating node to originate from the subscriber host, by spoofing the source address of the subscriber node in the resource release communication and which indicates to the resource allocating node that the resource is no longer to be used by the subscriber host;
    wherein the resource allocating node will not release the resource assigned to the subscriber host by the resource allocating node from the subscriber host for use by other subscriber hosts prior to the expiration of the DHCP lease term, unless a DHCP resource release communication is received by the resource allocating node for the resource from the subscriber host;
    wherein the resource is available for re-allocation by the resource allocating node when the resource allocating node receives the resource release communication from the subscriber host.

2. A method as recited in claim 1, wherein the resource comprises an IP address associated with the subscriber host.

3. A method as recited in claim 1, wherein the address associated with the subscriber host comprises an IP address associated with the subscriber host.

4. A method as recited in claim 1, wherein the address associated with the subscriber host comprises the resource.

5. A method as recited in claim 1, further comprising receiving an indication that the resource has been assigned to the subscriber host by the resource allocating node.

6. A method as recited in claim 5, wherein receiving an indication that the resource has been assigned to the subscriber host by the resource allocating node comprises monitoring a communication between the subscriber host and the resource allocating node.

7. A method as recited in claim 5, wherein receiving an indication that the resource has been assigned to the subscriber host by the resource allocating node comprises extracting from a communication between the subscriber host and the resource allocating node data indicating that the resource has been assigned to the subscriber host.

8. A method as recited in claim 7, wherein the data includes a DHCP lease term for which the resource has been assigned.

9. A method as recited in claim 1, wherein receiving said indication that the resource is no longer to be used by the subscriber host includes determining that a term for which the resource was assigned to the subscriber host has not expired.

10. A method as recited in claim 1, wherein receiving said indication that the resource is no longer to be used by the subscriber host comprises an indication that a change of authorization has occurred with respect to the subscriber host such that the subscriber host will no longer be using the resource to access a network service.

11. A method as recited in claim 1, further comprising updating a subscriber host data store accessed only by the intermediary node to reflect that the subscriber host will no longer be using the resource.

12. A system for providing network access, comprising:
    a subscriber host, wherein the subscriber host comprises a DHCP client;

a resource allocating node, wherein the resource allocating node comprises a DHCP server;

an intermediary node other than the subscriber host or the resource allocating node further comprising a communication interface and a processor coupled to the communication interface and operable to:

receive via the communication interface at the intermediary node, an indication that a resource assigned to the subscriber host by the resource allocating node will no longer to be used by the subscriber host;

wherein the intermediary node comprises a provider equipment associated with a provider network;

wherein the subscriber host uses the resource to access a network service via the intermediary node; and wherein the intermediary node manages indications from the subscriber host regarding resource usage on behalf of the subscriber host such that actual resource usage is synchronized between subscribers and the resource allocating node by tracking resource usage in the intermediary node;

if the DHCP lease term associated with the resource is determined to have not expired or will not expire within a period prescribed by the resource allocating node, send to the resource allocating node from the intermediary node, via the communication interface, a resource release communication that is not originated from the subscriber host, but appears to the resource allocating node to originate from the subscriber host and which indicates to the resource allocating node that the resource is no longer to be used by the subscriber host;

wherein the resource allocating node will not release the resource assigned to the subscriber host by the resource allocating node from the subscriber host for use by other subscriber hosts prior to the expiration of the DHCP lease term unless a DHCP resource release communication is received by the resource allocating node for the resource from the subscriber host;

wherein the resource is available for re-allocation by the resource allocating node when the resource allocating node receives the resource release communication from the subscriber host.

13. A system as recited in claim 12, further comprising a subscriber host data store accessed only by the intermediary node to store data associating the resource with the subscriber host.

14. A computer program product for managing a network resource, the computer program product being embodied in a non-transitory computer readable storage medium encoded with computer executable instructions for:

receiving at an intermediary node other than a subscriber host or a resource allocating node an indication that a resource assigned to the subscriber host by the resource allocating node will no longer to be used by the subscriber host;

wherein the resource allocating node comprises a DHCP server;

wherein the subscriber host comprises a DHCP client;

wherein the intermediary node comprises a provider equipment associated with a provider network via which the subscriber host uses the resource to access a network service; and wherein the intermediary node manages indications from the subscriber host regarding resource usage on behalf of the subscriber host such that actual resource usage is synchronized between subscribers and the resource allocating node by tracking resource usage in the intermediary node; and if the DHCP lease term associated with the resource is determined to have not expired or will not expire within a period prescribed by the resource allocating node, sending to the resource allocating node from said intermediary node a resource release communication that is not originated from the subscriber host, but appears to the resource allocating node to originate from the subscriber host and indicates to the resource allocating node that the resource is no longer to be used by the subscriber host;

wherein the resource allocating node will not release the resource assigned to the subscriber host by the resource allocating node from the subscriber host for use by other subscriber hosts prior to the expiration the DHCP lease term unless a DHCP resource release communication is received by the resource allocating node for the resource from the subscriber host;

wherein the resource is available for re-allocation by the resource allocating node when the resource allocating node receives the resource release communication from the subscriber host.

* * * * *